(12) United States Patent
Caceres

(10) Patent No.: US 10,104,844 B2
(45) Date of Patent: Oct. 23, 2018

(54) INDOOR IRRIGATION SYSTEM

(71) Applicant: Mauel Jose Caceres, Charleston, WV (US)

(72) Inventor: Mauel Jose Caceres, Charleston, WV (US)

( * ) Notice: Subject to any disclaimer, the term of this patent is extended or adjusted under 35 U.S.C. 154(b) by 0 days.

(21) Appl. No.: 14/628,266

(22) Filed: Feb. 22, 2015

(65) Prior Publication Data

US 2016/0242369 A1 Aug. 25, 2016

(51) Int. Cl.
*A01G 27/00* (2006.01)

(52) U.S. Cl.
CPC ......... *A01G 27/001* (2013.01); *A01G 27/005* (2013.01)

(58) Field of Classification Search
CPC .... A01G 27/00; A01G 27/001; A01G 27/003; A01G 27/05; A01G 27/006; A01G 27/008
See application file for complete search history.

(56) References Cited

U.S. PATENT DOCUMENTS

| | | | | |
|---|---|---|---|---|
| 3,085,364 A * | 4/1963 | Chapin | ................ | A01G 27/001 137/318 |
| 3,216,663 A * | 11/1965 | Frampton | ............ | A01G 27/001 137/106 |
| 4,347,687 A * | 9/1982 | Sibbel | .................. | A01G 27/003 119/77 |
| 4,447,983 A * | 5/1984 | Shinada | ............... | A01G 27/005 47/48.5 |
| 4,653,529 A * | 3/1987 | Freeman | ............... | A01G 27/001 137/453 |
| 4,846,206 A * | 7/1989 | Peterson | .............. | A01G 27/001 137/1 |
| 5,749,170 A | 5/1998 | Furuta | | |
| 5,956,893 A * | 9/1999 | Harrison | ............... | A01G 9/1423 47/39 |
| 6,036,104 A * | 3/2000 | Shih | ....................... | A01G 25/02 137/78.3 |
| 6,145,755 A * | 11/2000 | Feltz | .................... | A01G 25/167 137/624.11 |
| 6,695,231 B2 * | 2/2004 | Dramm | ................ | A01G 27/005 239/510 |
| 7,201,333 B2 * | 4/2007 | Yoshikawa | .......... | A01G 27/003 239/145 |

(Continued)

*Primary Examiner* — Michael H Wang
(74) *Attorney, Agent, or Firm* — Blake E. Vande Garde; Erickson Kernell IP, LLC

(57) ABSTRACT

An irrigation system designed to provide water to indoor plants comprising a water reservoir containing water, a water pump submerged in the water within the reservoir and connected to a power source, a timer operatively associated with the water pump and power source, wherein the timer operates to activate and deactivate the water pump at intervals determined by the system user, one or more sections of tubing secured at one end to the water pump to direct water pumped from the water reservoir through the tubing to the indoor plants and one or more emitters secured to the opposite end of the tubing wherein the emitters are located within a pot or near the indoor plants that the system user wants to water and wherein the emitters are selected from the group consisting of: pressure adjustable drippers, pressure adjustable sprayers, pressure adjustable soaker hoses, or a combination thereof.

12 Claims, 5 Drawing Sheets

(56) References Cited

U.S. PATENT DOCUMENTS

| | | | | |
|---|---|---|---|---|
| 7,222,454 B1* | 5/2007 | Chen | A01G 27/003 | 47/48.5 |
| 7,607,257 B2* | 10/2009 | Goldberg | A01G 27/02 | 47/48.5 |
| 7,823,326 B2 | 11/2010 | Hui | | |
| 8,166,704 B1* | 5/2012 | Sydlowski | A01G 25/162 | 47/48.5 |
| 8,408,229 B2* | 4/2013 | Goldberg | A01G 25/167 | 137/78.3 |
| 8,584,397 B1* | 11/2013 | Marsh | A01G 27/003 | 47/48.5 |
| 8,725,301 B2* | 5/2014 | Carskadon | A01G 27/001 | 137/101.27 |
| 2002/0029517 A1* | 3/2002 | Hutchinson | A01G 27/005 | 47/39 |
| 2002/0116870 A1* | 8/2002 | Chen | A01G 27/006 | 47/48.5 |
| 2008/0135647 A1* | 6/2008 | France | A01G 27/005 | 239/542 |
| 2010/0199555 A1* | 8/2010 | Pole | A01G 27/005 | 47/62 R |
| 2010/0320291 A1* | 12/2010 | Chen | A01G 27/04 | 239/450 |
| 2014/0075837 A1* | 3/2014 | Little | A01G 25/02 | 47/48.5 |
| 2014/0075841 A1* | 3/2014 | Degraff | A01G 27/005 | 47/62 A |
| 2015/0000190 A1* | 1/2015 | Gibbons | A01G 27/005 | 47/66.6 |
| 2015/0096228 A1* | 4/2015 | Watson | A01G 27/005 | 47/79 |
| 2015/0136241 A1* | 5/2015 | Nguyen | A01G 27/005 | 137/130 |
| 2015/0313100 A1* | 11/2015 | Narinder | A01G 27/008 | 239/589 |
| 2016/0081283 A1* | 3/2016 | Pierce | A01G 27/003 | 47/80 |

* cited by examiner

INDOOR IRRIGATION SYSTEM

FIELD OF THE INVENTION

The present invention relates to irrigation systems which may be used indoors for edible and inedible plants.

BACKGROUND OF THE INVENTION

As the population has migrated from rural to neighborhood and urban settings, more and more people are raising plants indoors. However, raising plants indoors has numerous drawbacks, the number one drawback being watering the plants. Indoor water irrigation is mainly accomplished by spilling water into the soil of a pot containing one or more plants. A plant's watering needs depend on a variety of factors including plant type, plant species, plant size, room temperature, room humidity and container size. A plant's food and watering needs also create additional work for those individuals who care for the plant. Many indoor plants perish due to a care taker either forgetting to water the plant regularly or through overwatering a plant. This problem becomes even more paramount when a caretaker is away on vacation or business. Indoor plants are expensive and time-consuming to replace if not cared for properly.

Generally speaking, a caretaker must tend to each potted plant individually, determining when and how much water and food to provide to each plant. Plants of different types may require different amounts of water or water at different intervals. Whether of the same or a different type, plants located in sunny versus shaded areas or located in different types or sizes of pots may all have different levels of water usage. Thus, a caretaker may need to monitor and tend to some plants on a daily basis, while other plants may require attention more sporadically. This cumbersome tending process requires the presence of the caretaker. Thus, when a homeowner leaves their home for a period of time, such as for a vacation, the homeowner must find another individual to tend to the plants in order to prevent damage or demise.

Various solutions have been proposed to these problems. In the case of outdoor plants, automated irrigation systems are known. These systems generally utilize pipes to deliver water from a source to a sprinkler head or similar delivery device, from which the water is dispensed. A timer is configured to turn valves on an off, thus controlling the flow of water through the pipes. Previously, this type of system was not well suited for indoor use. A single pipe delivering the same amount of water to each plant or station it is located near will result in uneven, overwatering, or underwatering of indoor plants.

It is clear that a need exists to provide an adjustable, individual, efficient, environmentally friendly and extended use indoor irrigation system.

SUMMARY OF THE INVENTION

An irrigation system designed to provide water to indoor plants comprising a water reservoir containing water, a water pump submerged in the water within the reservoir and connected to a power source, a timer operatively associated with the water pump and power source, wherein the timer operates to activate and deactivate the water pump at intervals determined by the system user, one or more sections of tubing secured at one end to the water pump to direct water pumped from the water reservoir through the tubing to the indoor plants and one or more emitters secured to the opposite end of the tubing wherein the emitters are located within a pot or near the indoor plants that the system user wants to water and wherein the emitters are selected from the group consisting of: pressure adjustable drippers, pressure adjustable sprayers, pressure adjustable soaker hoses, or a combination thereof.

DETAILED DESCRIPTION

Figure 1:
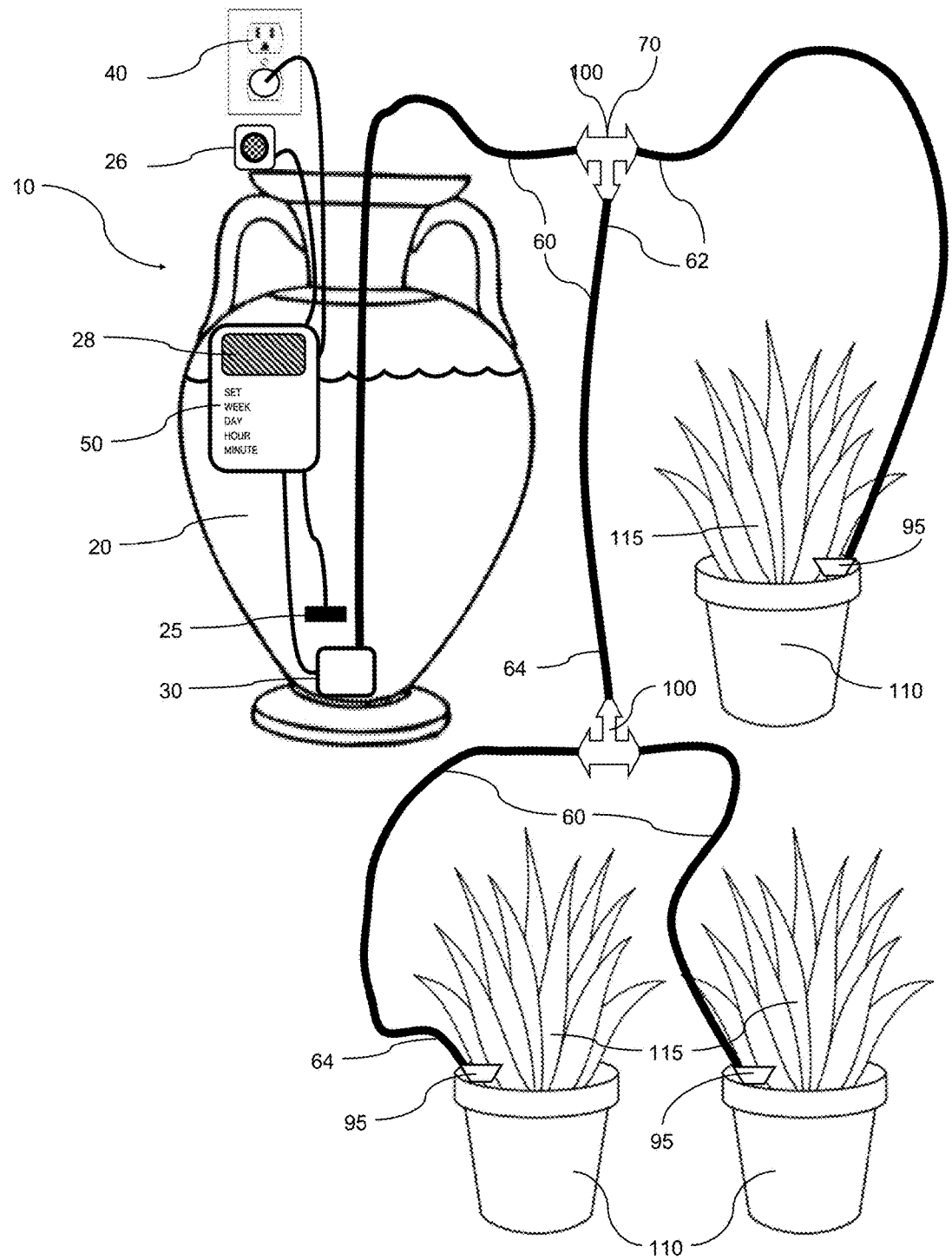
FIG. 1 illustrates one embodiment of an irrigation system including a reservoir and a plurality of plants.
Figure 2:
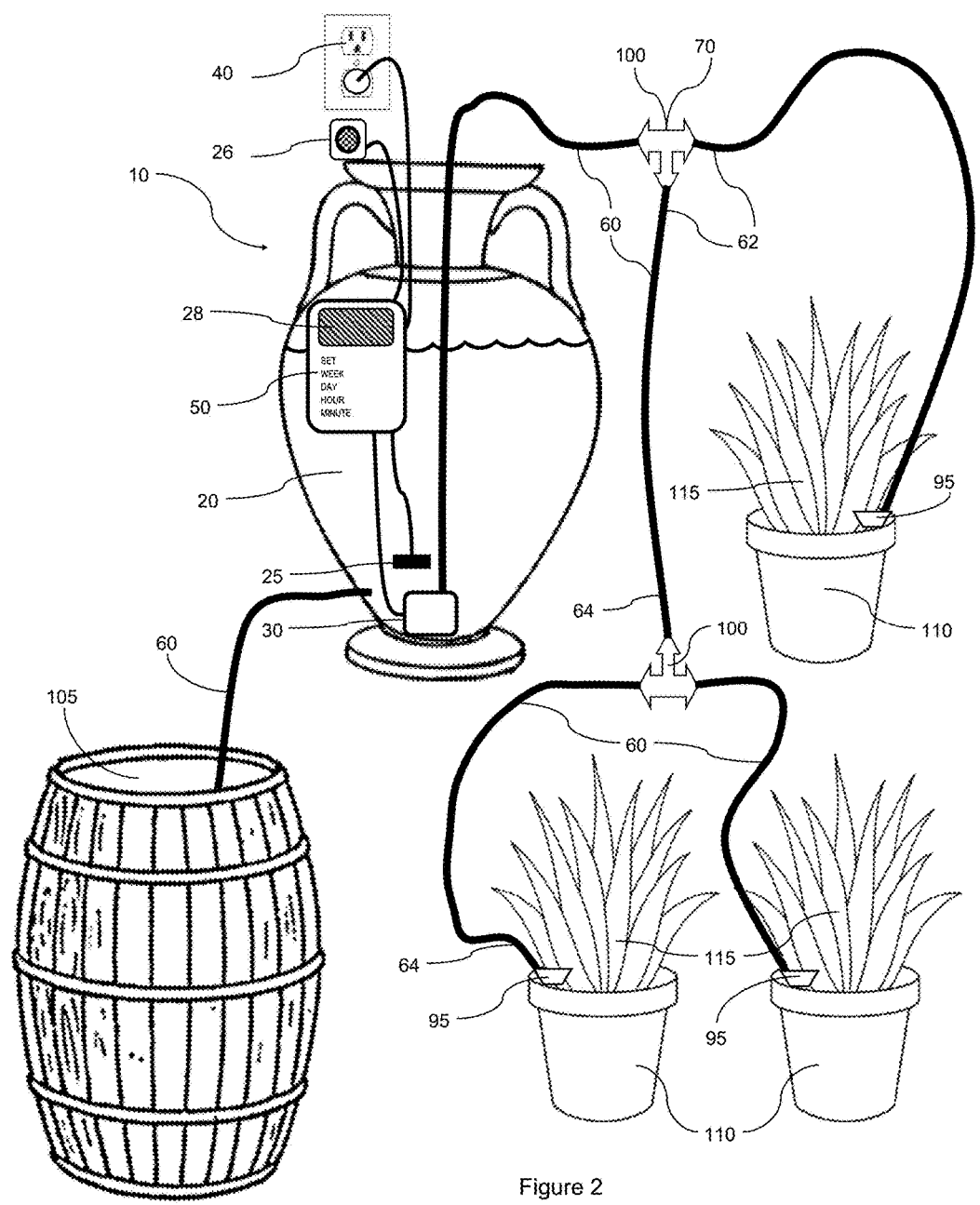
FIG. 2 illustrates one embodiment of an irrigation system including a reservoir, a cistern and a plurality of plants.
Figure 3:
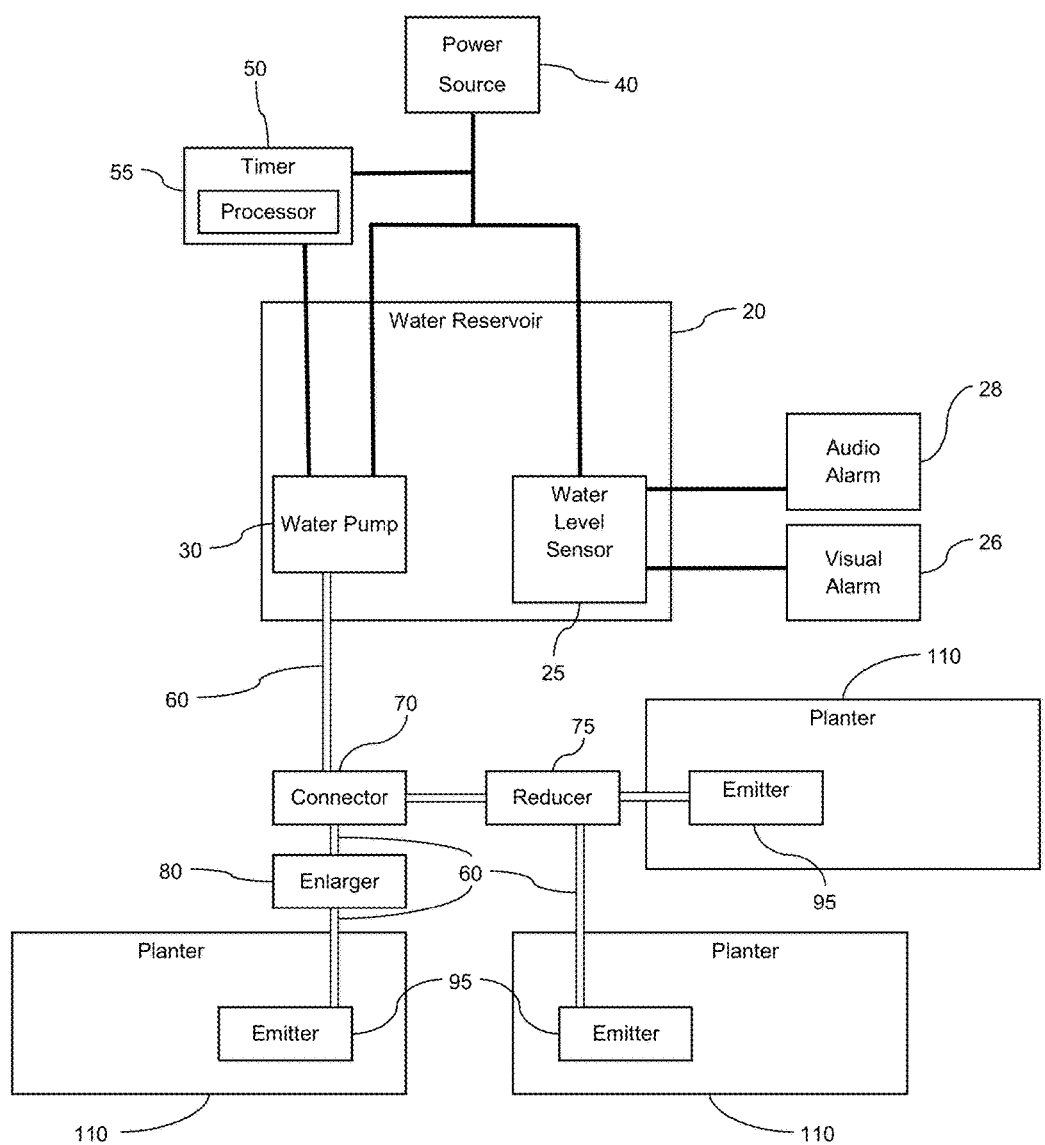
FIG. 3 is a block diagram of the present invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Looking to FIGS. 1-5, there is illustrated an embodiment of the present invention which discloses an irrigation system 10 designed to provide water to indoor plants 115 comprising a water reservoir 20 containing water, a water pump 30 submerged in the water within the water reservoir 20 and connected to a power source 40, a timer 50 operatively associated with the water pump 30 and/or the power source 40, wherein the timer 50 operates to activate and deactivate the water pump 30 at intervals determined by the system user, one or more sections of tubing 60 secured at one end to the water pump 30 where the tubing 60 is used to direct water pumped from the water reservoir 20 by the water pump 30 through the tubing 60 to the indoor plants 115 and one or more emitters, 95 secured to the tubing 60 at the end opposite the end secured to the water pump 30, wherein the emitters, 95 are located either within a pot/planter 110 or near the indoor plants 115 that the system user wants to water, wherein the emitters 95 are selected from the group comprising pressure adjustable drippers, pressure adjustable sprayers, pressure adjustable soaker hoses, or a combination thereof.

Houseplants are commonly grown for a multitude of reasons, including decoration, psychological effects, physiological effects and even for interior air purification. Irrigation is one of several factors which must be accounted for. If one or more persons plans to grow and maintain plant life indoors. Other factors include light exposure, soil mixture, temperature, humidity, fertilizers, potting and pest control. Irrigation refers to the artificial application of water to plants and/or soil. Indoors, on scales both large and small, irrigation is used to assist in the growing of agricultural crops, as well for use with houseplants which are grown in residential and commercial buildings. Indoor water irrigation is primarily completed by spilling water into the soil contained within a pot that has one or more plants contained within it. Both under watering and overwatering can be detrimental to an interior plant. If a person is available on a near daily basis to monitor a plant's soil moisture content, then maintaining proper hydration of a plant is a reasonably easy task. However, if a person is not available to monitor a plant's soil moisture content, then a great deal of time and money may be wasted if the plant dies.

The water reservoir 20 contemplated by the present invention may include any kind of vessel capable of holding one or more gallons of water. More specifically, the water reservoir 20 may include a decorative vase which holds two or more gallons of water. The decorative vase must be large enough to accommodate a water pump 30 which is submerged in the water within the water reservoir 20. The water reservoir 20 may also contain a timer 50 and a water level sensor 25.

A water pump 30 refers to any device capable of pumping water from within the water reservoir 20 out through a series of tubes to the planters 110 containing the plants 115. In one embodiment of the instant invention, the water pump 30 is a submersible water pump. The water pump 30 may also be magnetic. The water pump 30 should have the capacity to pump between 50 and 500 gallons of water per hour. Examples of acceptable water pumps 30 include, but are not limted to, the 50-80 gallons per hour (GPH) fountain pump sold by Smartpond®, the 100-155 GPH fountain pump sold by Smartpond®, the 130-170 GPH fountain pump with low water shut-off sold by Smartpond®, or the 200-300 GPH fountain pump with low-water shut off sold by Smartpond®. The water pump 30 is connected to a power source 40. A power source 40 may include an electrical outlet, a generator, a battery, a solar panel, or a combination thereof. In one embodiment of the present invention, the water pump 30 is also magnetic. In one embodiment, a water pump 30 may be operationally associated with a water level sensor 25 which is located within a water reservoir 20 and is located at a desired level in order to alert the system user that the water level is at or approaching a certain level. The water level sensor may be operationally associated either by wire or wirelessly with a visual alarm 26, and audio alarm 28, or a combination thereof.

A timer 50 refers to any device which is capable of being programmed to set one or more watering cycle(s) which activate and deactivate a water pump 30 in order to water one or more interior plants for a desired number of weeks, days, hours, and/or minutes desired by a system user. In one embodiment of the instant invention, the timer 50 is an analog design. In another embodiment, the timer 50 is a digital timer which is programmable. The timer 50 may be operationally associated with a computer processor 55 The timer 50 may be set to activate and deactivate the water pump 30 for a few minutes each day, for a few minutes every other day, for an hour every 3 days, for a few minutes every week, or any other combination desired by a system user. The timer 50 and the computer processor 55 may each be operationally associated with the water level sensor 25, the visual alarm 26, and the audio alarm 28 in order to deactivate the system if the water level becomes too low, or to alert the user regarding the current water level. The timer 50 can automatically adjust to daylight savings time. Each timer 50 may control one or more water pumps 30. Each water pump 30 is plugged into a timer 50 which is connected to a power source, as described above.

Figure 5:
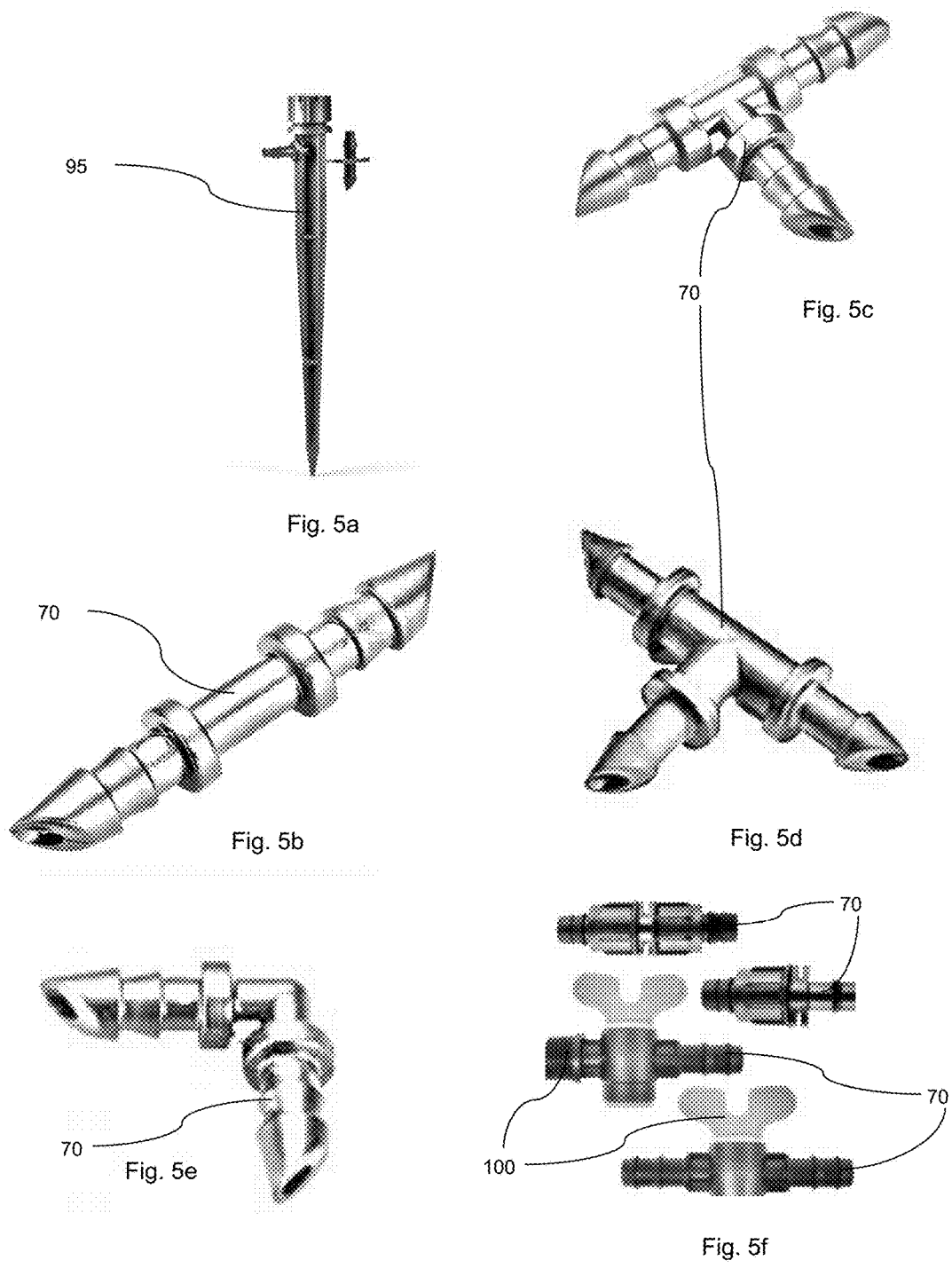
FIG. 5a illustrates one embodiment of an emitter.
FIGS. 5b, 5c, 5d and 5e illustrate embodiments of connectors.
FIG. 5f illustrates embodiments of connectors and valves.

One or more sections of tubing 60 having a proximal end 62 and a distal end 64 are operationally associated with the water pump 30. A section of tubing 60 is connected at its proximal end 62 to either connector 70 which is connected to a water pump 30 or connected directly to the water pump 30. Tubing is used to direct water pumped from the water reservoir 20 by the water pump 30 through the tubing 62. The indoor plants 115. The diameter of the tubing may include any diameter known in the art and include 1 inch, ¾ inch, ⅝ inch, ½ inch, ⅜ inch, ¼ inch diameter tubing. 2 pieces of tubing 60 may be connected to one another using connectors 70 as illustrated in FIG. 5. The connectors include any connector known in the art such as straight connectors (FIG. 5b), T-connectors (FIGS. 5c and 5d), and elbow connectors (FIG. 5e). The irrigation system 10 may also make use of reducers, which will change from a wider diameter to a narrower diameter (i.e. ⅝ inch to ⅜ inch). The irrigation system 10 may also make use of enlargers which will change from a narrower diameter to a wider diameter (i.e. ⅜ inch to ⅝ inch). One or more emitters 95 are secured to the distal ends 64 of tubes 60. One or more emitters 95 are located within a pot or near the indoor plants that the system user wants to water. Emitters 95 are selected from the group consisting of: pressure adjustable drippers, pressure adjustable sprayers, pressure adjustable soaker hoses, or a combination thereof. Water flow to each individual pot, planter and/or plant may be adjusted at the emitter.

In one embodiment of the instant invention, the irrigation system further comprises one or more open/close valves 100 which may be located within the system and are operationally associated with the timer 50 and/or processor 55 in order to allow one pot/planter 110 and/or plant 115 to receive water at a designated time while a separate pot/plantar 110 and/or plant 115 receives no water at the same time, even if attached to the same feeder piece of tubing 60. For example, looking to FIGS. 1 and 2, the valve 100 depicted as having one incoming tube 60 which is then split into two outgoing tubes which are directed to the two plants 115 at the bottom of each figure. The valve may be programmed or activated to allow the plant on the lower right to be watered daily, while simultaneously programmed or activated to allow the plant on the lower left to be watered every other day (or every third day, weekly, etc.). Each valve 100 may be operated by wire or wirelessly to either permit or restrict the flow of water through a valve or a connector 70 operationally associated with a valve. Each valve 100 may be programmed in the same manner that a timer 50/processor 55 is programmed and permits the programming of the system to water one or more plants daily, while simultaneously watering other plants every other day. The valves permit a wide variety of watering options depending on how often and how long each water pump 30 is turned on and which valves allow water to flow through which tubes 60. In one embodiment of the instant invention, the valves 100 may be activated (i.e., opened or closed) manually, electronically, or a combination thereof.

Figure 4:
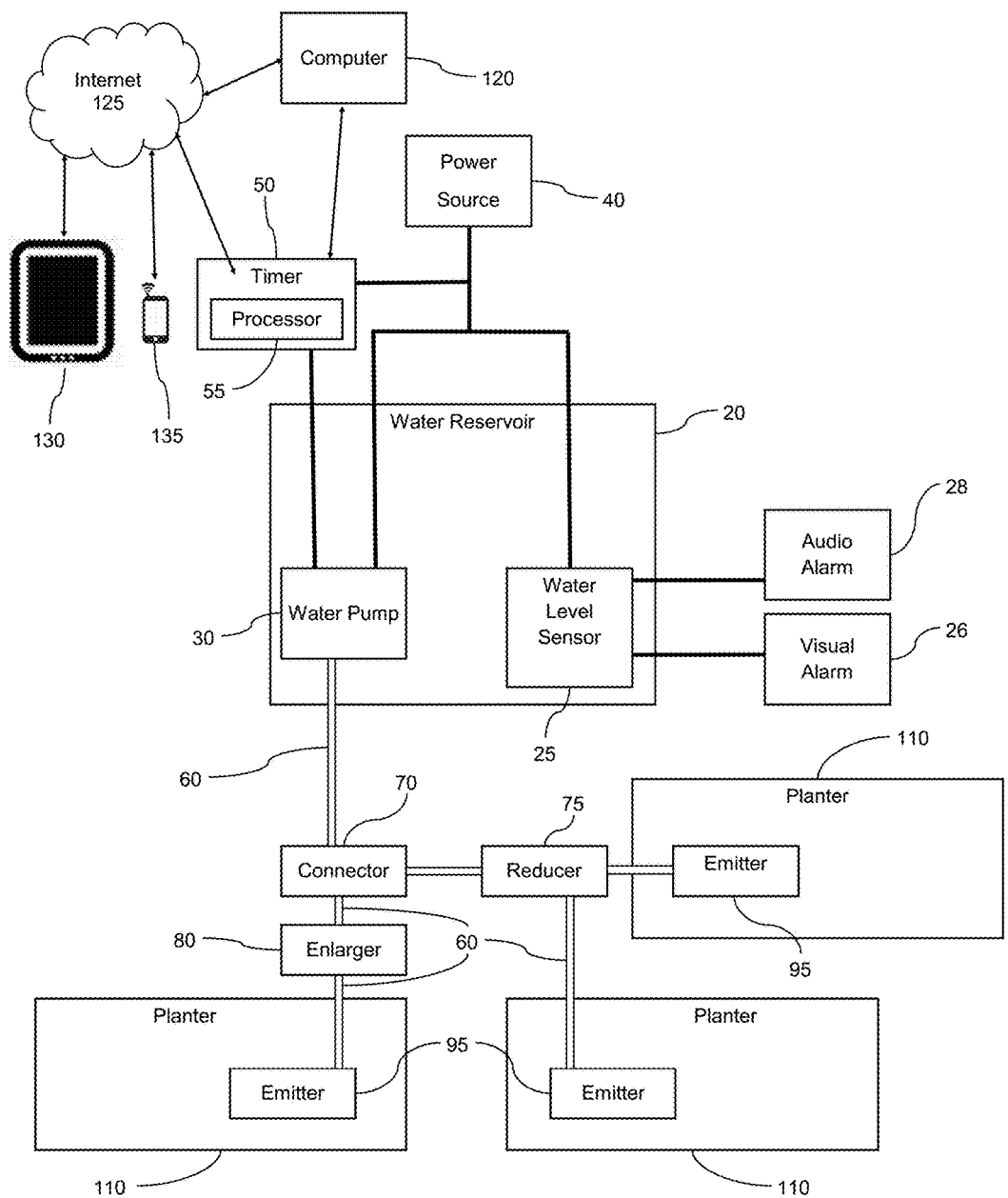
FIG. 4 is a block diagram of the present invention with additional elements.

The irrigation system 10 may include one or more processors and/or modules 55 operationally associated with the programmable timer 50, the water pump(s) 30 the valve(s) 100 or any other electrically operated component of the system. The processor and/or module 55 allows one or more system user to monitor, adjust and program the irrigation system 10 remotely using a programming device. Programming devices include, but are not limited to, computer terminals 120 may include a personal computer, a general purpose computer, a workstation, a smart phone 135, a tablet 130, or a combination thereof. Looking to FIG. 4, an embodiment illustrates a computer terminal which may be operated remotely from the system, gaining access to the system through the internet 125. The same Figure illustrates that a tablet 130 (i.e., Amazon Kindle, Apple iPad, Samsun Galaxy, etc.) or smart phone 135 (iPhone, Blackberry, Droid Razr, etc.) may be used by system user to activate, monitor, update or alter the system and/or system program. FIG. 4 also illustrates a computer terminal 120 connected directly to the irrigation system 10. The various types of computer terminals 120 may access the irrigation system directly (i.e., an intranet connection), or remotely through the use of an internet browser (i.e., Microsoft Internet Explorer, Mozilla Firefox, Google Chrome, a remote desktop connection, etc.).

In one embodiment of the instant invention, the system further comprises the addition of one or more types of fertilizer added to the water reservoir 20. In another embodiment of the instant invention, the irrigation system further comprises a cistern 105 operationally associated with the water reservoir 20 and a water level sensor 25 is located within the water reservoir 20, wherein water (rain water, well water, creek water, municipal water, etc.) is collected within the cistern 105 and directed to replenish the water supply within the water reservoir 20 when the water level sensor 25 detects that the water level within the water reservoir is below a pre-determined level, which then activates a water pump 30 to pump water from the cistern 105 to the water reservoir 20. The cistern 105 is connected to the water reservoir 20 by one or more sections of tubing 60. The cistern 105 may be located at an elevation above the water reservoir 20 making a water pump unnecessary. Instead, one or more valves 100 may be operationally associated with the water level sensor 25 which will open the valve(s) for a period of time when the water level is detected to be below a certain level and then close the valve(s) when that time has expired. In one embodiment of the instant invention, the water pump 30 and/or the valve(s) operationally associated with the cistern 105 and a timer 50/processor 55 may be used to refill the water reservoir 20 according to a preprogrammed schedule.

In one embodiment of the instant invention, the irrigation system 10 is assembled by wiring or plugging in a timer 50 into a power source 40, wiring or plugging in a water pump 30 to the timer, attaching a connector 70 and or a section of tubing 60 to the water pump 30, submerging the water pump into water contained in the water reservoir 20, extending the tubing 60 as designated by the system user using connectors 70, reducers 75, enlargers 80 and/or valves 100 to extend at least one section of tubing to each pot, planter or plant, attaching an emitter 95 to the distal end of each section of tubing and either placing the emitter within a pot or planter or locating the emitter in close proximity to a pot, planter or plant. After assembly, the timer 50 and or processor 55 may be programed on site or remotely by a system user to a desired watering schedule for each individual pot, planter or plant.

The present invention also describes a method of watering plants comprising the steps of:

a) locating an irrigation system 10 designed to provide water to indoor pots, planters 110 and/or plants 115 in the proximity of one or more indoor pots, planters and/or plants, the irrigation system comprising:

a water reservoir 20 containing water;

a water pump 30;

a timer 50 operatively associated with the water pump 30 and/or the power source 40, wherein the timer operates to activate and deactivate the water pump 20 at intervals determined by the system user;

one or more sections of tubing 60 secured at one end to the water pump 30, the tubing is used to direct water pumped from the water reservoir 20 by the water pump through the tubing to the indoor pots, planters and/or plants; and one or more emitters 95 secured to the tubing 60 at the end opposite the end secured to the water pump, wherein the emitters are located within a pot or near the indoor plants that the system user wants to water, wherein the emitters 95 are selected from the group consisting of: pressure adjustable drippers, pressure adjustable sprayers, pressure adjustable soaker hoses, or a combination thereof;

b) filling the water reservoir 20 with water;

c) submerging the water pump 30;

d) providing power to the water pump 30 and the timer 50 from a power source 40;

e) programming the timer and/or a processor 55 which is operationally associated with the timer, regarding frequency and duration of watering for each pot, planter or plant associated with the system; and f) activating the system to provide water to the indoor pots, planters and/or plants.

The various embodiments described previously about the various components and embodiments of the irrigation system 10 may also be applied to the above method.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

What is claimed is:

1. An irrigation system designed to provide water to indoor plants consisting of:
    a water reservoir containing water;
    a water pump submerged in the water within the water reservoir and connected to a power source;
    a timer operatively associated with said water pump and/or said power source, wherein said timer operates to activate and deactivate said water pump at intervals determined by the system user;
    wherein the timer is programmable;
    one or more sections of tubing secured at one end to said water pump, said tubing is used to direct water pumped from the water reservoir by the water pump through the tubing to the indoor plants;
    one or more open/close valves located on the distal ends of the sections of tubing and are operationally associated with the timer in order to allow one pot and/or plant to receive water at a designated time while a separate pot and/or plant receives no water at the same time wherein the open/close valves are electronically activated;
    one or more emitters secured to said tubing at the end opposite the end secured to said water pump, wherein said emitters are located within a pot or near the indoor plants that the system user wants to water, wherein the emitters are selected from the group consisting of: pressure adjustable drippers, pressure adjustable sprayers, or a combination thereof; and
    a processor and/or module operationally associated with the programmable timer where said module allows one or more system users to monitor, adjust and program the irrigation system remotely from a desktop computer, a laptop computer, a tablet, a smartphone, or a combination thereof.

2. The irrigation system of claim 1 wherein the water pump is also magnetic.

3. The irrigation system of claim 1 wherein the timer is a digital timer.

4. The irrigation system of claim 3 wherein the timer is programmable.

5. The irrigation system of claim 1 wherein the water reservoir holds at least two gallons of water.

6. The irrigation system of claim 1 wherein the open/close valves are electronically activated by wire or wirelessly to either permit or restrict the flow of water through each valve or a connector operationally associated with the valve.

7. An irrigation system designed to provide water to indoor plants consisting of:
    a water reservoir containing water;
    a water pump submerged in the water within the water reservoir and connected to a power source;
    a timer operatively associated with said water pump and/or said power source, wherein said timer operates to activate and deactivate said water pump at intervals determined by the system user;
    wherein the timer is programmable;
    one or more sections of tubing secured at one end to said water pump, said tubing is used to direct water pumped from the water reservoir by the water pump through the tubing to the indoor plants;
    one or more open/close valves located on the distal ends of the sections of tubing and are operationally associated with the timer in order to allow one pot and/or plant to receive water at a designated time while a separate pot and/or plant receives no water at the same time wherein the open/close valves are electronically activated;
    one or more emitters secured to said tubing at the end opposite the end secured to said water pump, wherein said emitters are located within a pot or near the indoor plants that the system user wants to water, wherein the emitters are selected from the group consisting of: pressure adjustable drippers, pressure adjustable sprayers, or a combination thereof;
    the addition of one or more types of fertilizer added to the water reservoir;
    a cistern operationally associated with the water reservoir and a water level sensor is located within the water reservoir, wherein rain water is collected within the cistern and directed to replenish the water supply within the water reservoir when the water level sensor detects that the water level within the water reservoir is below a pre-determined level; and
    a processor and/or module operationally associated with the programmable timer where said module allows one or more system users to monitor, adjust and program the irrigation system remotely from a desktop computer, a laptop computer, a tablet, a smartphone, or a combination thereof.

8. A method of watering plants comprising the steps of:
    locating an irrigation system designed to provide water to indoor pots, planters and/or plants in the proximity of one or more indoor pots, planters and/or plants, said irrigation system consisting of:
    a water reservoir containing water;
    a water pump;
    a timer operatively associated with said water pump and/or said power source, wherein said timer operates to activate and deactivate said water pump at intervals determined by the system user;
    wherein the timer is programmable;
    one or more sections of tubing secured at one end to said water pump, said tubing is used to direct water pumped from the water reservoir by the water pump through the tubing to the indoor pots, planters and/or plants;
    one or more open/close valves located on the distal ends of the sections of tubing and are operationally associated with the timer in order to allow one pot and/or plant to receive water at a designated time while a separate pot and/or plant receives no water at the same time wherein the open/close valves are electronically activated;
    one or more emitters secured to said tubing at the end opposite the end secured to said water pump, wherein said emitters are located within a pot or near the indoor plants that the system user wants to water, wherein the emitters are selected from the group consisting of: pressure adjustable drippers, pressure adjustable sprayers, or a combination thereof; and
    a processor and/or module operationally associated with the programmable timer where said module allows one or more system users to monitor, adjust and program the irrigation system remotely from a desktop computer, a laptop computer, a tablet, a smartphone, or a combination thereof;
    filling the water reservoir with water;

submerging the water pump;

providing power to the water pump and the timer;

programming the timer and/or a processor (55) which is operationally associated with the timer, regarding frequency and duration of watering for each pot, planter or plant associated with the system; and activating the system to provide water to the indoor pots, planters and/or plants.

9. The irrigation system of claim 8 wherein the water pump is also magnetic.

10. The irrigation system of claim 8 wherein the timer is a digital timer.

11. The irrigation system of claim 8 wherein the water reservoir holds at least two gallons of water.

12. The irrigation system of claim 8 wherein the open/close valves are electronically activated by wire or wirelessly to either permit or restrict the flow of water through each valve or a connector operationally associated with the valve.

\* \* \* \* \*